United States Patent [19]
McGibney

[11] Patent Number: 5,889,759
[45] Date of Patent: Mar. 30, 1999

[54] OFDM TIMING AND FREQUENCY RECOVERY SYSTEM

[75] Inventor: Grant McGibney, Calgary, Canada

[73] Assignee: Telecommunications Research Laboratories, Alberta, Canada

[21] Appl. No.: 696,315

[22] Filed: Aug. 13, 1996

[51] Int. Cl.$^6$ .................................................. H04J 11/00
[52] U.S. Cl. .................... 370/207; 375/261; 375/331; 375/344; 455/208; 455/517
[58] Field of Search .................... 370/203, 206, 370/207, 343, 480, 482, 503, 515; 375/200, 202, 206, 261, 324, 330, 331, 340, 344, 345, 362, 376; 455/42, 45, 502, 507, 517, 59, 60, 192.1, 192.2, 195.1, 196.1, 200.1, 205, 208

[56] References Cited

U.S. PATENT DOCUMENTS

| | | | |
|---|---|---|---|
| 4,679,227 | 7/1987 | Hughes-Hartogs | 379/93.31 |
| 5,206,886 | 4/1993 | Bingham | 375/344 |
| 5,345,440 | 9/1994 | Gledhill et al. | 370/210 |
| 5,369,670 | 11/1994 | Zagloul et al. | 370/210 |
| 5,406,551 | 4/1995 | Saito et al. | 370/203 |
| 5,444,697 | 8/1995 | Leung et al. | 370/207 |
| 5,506,836 | 4/1996 | Ikeda et al. | 370/203 |

FOREIGN PATENT DOCUMENTS

| | | | |
|---|---|---|---|
| 653 858 A2 | 11/1994 | European Pat. Off. | H04L 5/06 |
| 656 706 A2 | 11/1994 | European Pat. Off. | H04L 5/06 |

OTHER PUBLICATIONS

Implementation of a High Performance Wireless LAN, Grant McGibney, Abu Sesay, John McRory, Brad Morris, TR Labs, Calgary, Alberta, Canada, conference proceedings of "Wireless 94", Jul. 11–13, 1994, Calgary, pp. 645–650.

Primary Examiner—Alpus H. Hsu
Attorney, Agent, or Firm—Anthony R. Lambert

[57] ABSTRACT

A synchronizing apparatus for a differential OFDM receiver that simultaneously adjust the radio frequency and sample clock frequency using a voltage controlled crystal oscillator to generate a common reference frequency. Timing errors are found by constellation rotation. Subcarrier signals are weighted by using complex multiplication to find the phase differentials and then the timing errors. The reference oscillator is adjusted using the timing errors. Slow frequency drift may be compensated using an integral of the timing error. Frequency offset is found using the time required for the timing offset to drift from one value to another.

16 Claims, 5 Drawing Sheets

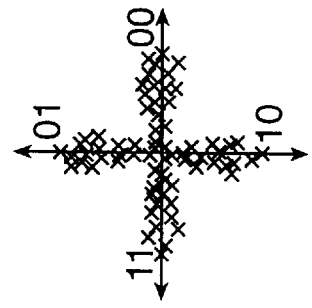
FIGURE 2A
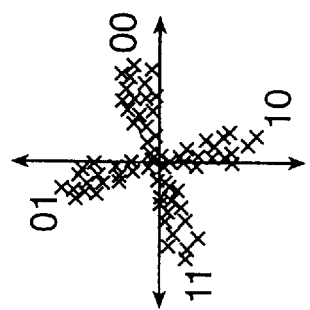
FIGURE 2B
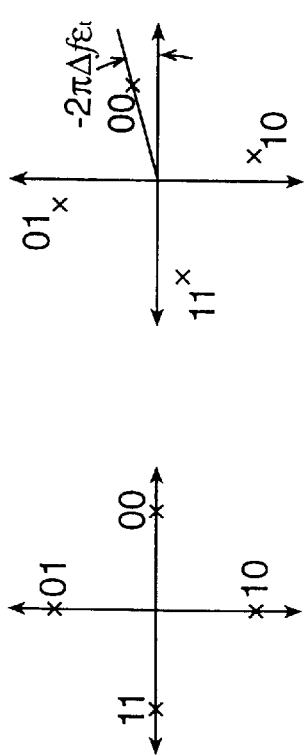
FIGURE 2C
FIGURE 2D
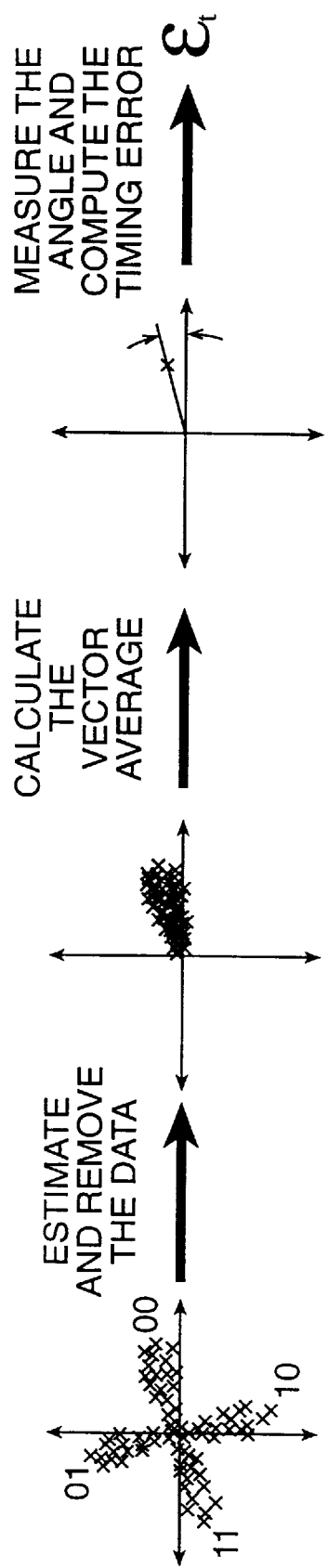
FIGURE 3

OFDM TIMING AND FREQUENCY RECOVERY SYSTEM

FIELD OF THE INVENTION

This invention relates to a timing and frequency synchronization method for orthogonal frequency division multiplexing (OFDM) signals, particularly as used in wireless local area networks (LANs).

BACKGROUND OF THE INVENTION

OFDM works by sending many frequency multiplexed, narrow band signals (subcarriers) together to form a wide band, high speed radio link. Frequency synchronization is required so that the closely spaced narrowband signals are not frequency shifted into a position where they interfere with each other. Timing recovery is needed to position the signal in the optimum sampling window and to make sure the phases of the subcarriers are properly aligned.

SUMMARY OF THE INVENTION

In one aspect of the present invention, a synchronization method uses the same signal that carries the data to simultaneously carry synchronization information (without reducing the data rate) and uses the same receiver that decodes the data to simultaneously measure synchronization errors. According to a further aspect of the invention, a single voltage controlled crystal oscillator (VCXO) at the wireless terminal provides a frequency reference for both the RF oscillators and the digital sampling clock in the receiver. A corresponding crystal in the base station may act as a time and frequency standard for all the terminals in the local cell. Terminals estimate the timing error between themselves and the base station from the received signal and then adjust their reference oscillators to eliminate it. When the feedback loop synchronizes the timing, frequency synchronization is also obtained since the RF oscillators share the same reference VCXO as the sampling clock. This technique allows the system to maintain frequency synchronization without explicitly measuring the frequency offset. Most OFDM systems use a pilot tone to provide a frequency reference for the terminal. This not only adds to the bandwidth and power of the transmitted signal but is also susceptible to multipath fading.

Tying the RF oscillator frequency to the sample clock frequency puts restrictions on the timing feedback loop. Timing errors are removed by adjusting the frequency of the sample clock slightly up or down. If, for example, the receiver was sampling the signal later than it was supposed to, then the VCXO frequency can be increased slightly so that the sampling clock catches up to the transmitted signal. During these timing adjustments, the RF oscillators are not in perfect synchronization. Care must be taken so that the frequency changes used to correct timing errors are small enough to keep the RF oscillator frequency within a tolerable range. Joint synchronization is possible because high speed, OFDM modulated signals allow some variation in both the timing and the RF carrier frequency without severely distorting the signal. For the implementation of the invention, for example in a wireless LAN, timing errors of ±100ns and frequency offsets of ±20 kHz are tolerable. For convenience, frequency offsets are expressed in parts per million. For example, for a 20 GHz carrier frequency the maximum allowable RF frequency error is 1 ppm.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration, in which like numerals denote like elements and in which:

FIG. 2A shows a differential OFDM constellation comprising four data values 11, 01, 00 and 10 without distortion;

FIG. 2B shows a differential OFDM constellation comprising four data values 11, 01, 00 and 10 with distortion due to timing error;

FIG. 2C shows a differential OFDM constellation comprising many subcarriers passing through a multipath channel;

FIG. 2D shows the constellation of FIG. 2C with timing errors minimized;

FIG. 3 illustrates the stages of a timing estimation algorithm according to one embodiment of the invention;

DETAILED DESCRIPTION OF PREFERRED EMBODIMENTS

Figure 1:
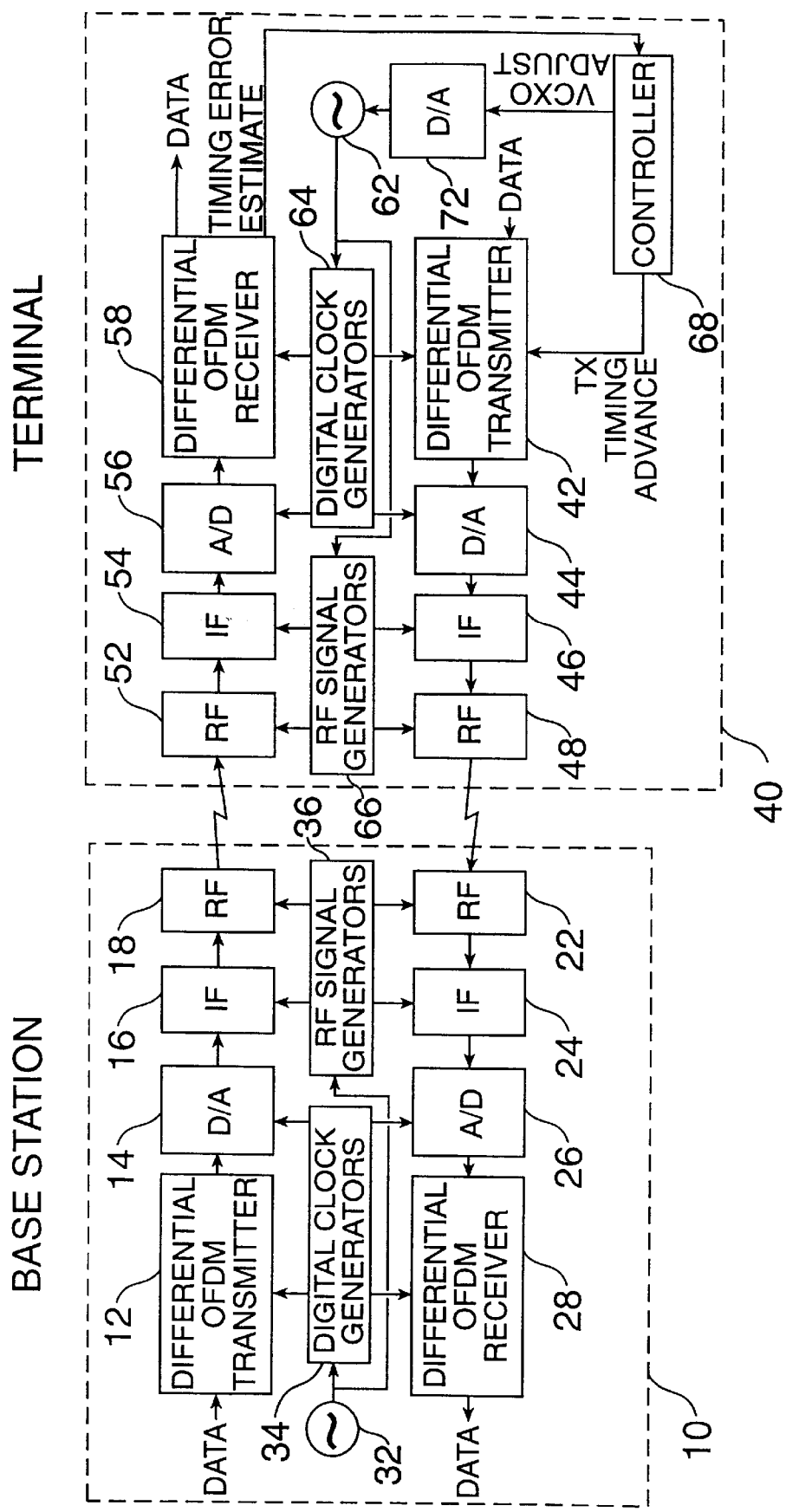
FIG. 1 is a schematic of apparatus that may be used in one embodiment of the invention.

Referring to FIG. 1, a base station 10 includes an OFDM transmitter 12, a digital to analog convertor 14, and a radio section formed of IF and RF transmitters 16 and 18 for upconverting baseband signals. The base station 10 also includes a radio section including RF receiver 22, IF downconvertor 24, analog to digital convertor 26 and OFDM receiver 28. A network reference oscillator 32 supplies a master reference frequency to digital clock generators 34 connected to the OFDM transmitter 12 and OFDM receiver 28, and to RF signal generators 36 connected to the downconvertors 22 and 24 and the upconvertors 16 and 18 in the transmit and receive radio sections respectively.

A wireless terminal 40 is used in conjunction with the base station 10 and includes an OFDM transmitter 42, a digital to analog convertor 44, and a radio section formed of IF and RF transmitters 46 and 48 for upconverting baseband signals. The wireless terminal 40 also includes a radio section for detecting RF OFDM signals including RF receiver 52, IF downconvertor 54, analog to digital convertor 56 (which may also be referred to as a sampler) connected to receive downconverted signals from the IF downconvertor 54 and OFDM receiver 58. A local voltage controlled reference oscillator (VCXO) 62 supplies a reference frequency to digital clock generators 64 connected to the OFDM transmitter 52 and OFDM receiver 58, and to RF signal generators 66 connected to the downconvertors 52 and 54 and the upconvertors 46 and 48 in the transmit and receive radio sections respectively. The digital clock generators 64 are connected to receive a reference frequency from the VCXO 62 and provide a digital clock to the sampler 56 and OFDM receiver 58. The RF signal generators 66 are also connected to receive the same reference frequency from the VCXO 62 and provide intermediate RF signals to the radio sections comprised of elements 46, 48, 52 and 54 for downconversion and upconversion of the received and transmitted signals respectively.

Still referring to FIG. 1, the OFDM receiver computes a timing error estimate from received signals or signal blocks supplied to it by the sampler 58 as described below in relation to FIG. 6A and supplies the timing error estimate to a controller 68. The controller 68, as described in more detail in relation to FIG. 6A, supplies a voltage, related to the timing error estimate, through Digital to Analog convertor 72 to control the VCXO 62. The timing error estimate may also be supplied by the controller 68 to the OFDM transmitter 42 to advance timing of signals transmitted by the wireless terminal 40.

All components in the base station 10 are conventional. The RF and IF sections, AtoD convertors, digital clock generators, RF signal generators, local reference oscillator and differential OFDM transmitter in the wireless terminal 40 may all be conventional elements. Further description of an exemplary base station 10 and wireless terminal that may be used in an embodiment of the invention may be found in "Implementation of High Performance Wireless LAN", McGibney et al, Proceedings, Wireless 94, Calgary, Canada, 1994, the content of which is hereby incorporated by reference.

Since timing error measurements use the same OFDM signals and receiver hardware that are used to carry network data the system is kept simple. This eliminates the overhead needed to send special timing signals and the extra receiver hardware that would be required to process those signals. The timing estimate is preferably based on the constellation rotation property of differential OFDM systems. The differential OFDM modulation scheme encodes data on frequency multiplexed subcarriers. If a subcarrier at frequency $f_1$ has a phase of $\theta_1$ and the next subcarrier at frequency $f_1 + \Delta f$ has a phase $\theta_2$ then the information is carried in the phase difference $\theta_2 - \theta_1$. A shift in time of $\epsilon_t$ (where a positive $\epsilon_t$ represents a signal arriving late or sampled early) causes the phase of each subcarrier to change by a value of $-2\pi\epsilon_t f$ (radians). The subcarriers are then sampled with phases equal to $\theta_1 - 2\pi\epsilon_t f_1$ and $\theta_2 - 2\pi\epsilon_t (f_1 + \Delta f)$ respectively. When the phase differential is evaluated to extract the data, the result is $[\theta_2 - 2\pi\epsilon_t (f_1 + \Delta f)] - [\theta_1 - 2\pi\epsilon_t f_1] = \theta_2 - \theta_1 - 2\pi\epsilon_t \Delta f$. The result includes both the data carrying phase difference $(\theta_2 - \theta_1)$ and a constant offset of $-2\pi\epsilon_t \Delta f$ (radians) caused by the timing error.

This derivation shows that an ideal OFDM signal with subcarriers separated by $\Delta f$ Hz and arriving $\epsilon_t$ seconds late has its constellation rotated by $-2\pi\Delta f\epsilon_t$ radians by comparison with a pre-determined distribution of the phases (typically 0°, 90°, 180° and 270°). For example, if the subcarrier spacing is 697 kHz, the maximum timing error of 100 ns rotates the constellation by 0.43 rad (25 degrees). The rotation required to rotate the constellation back to the pre-determined distribution constitutes an estimate of the timing error. FIG. 2A shows an ideal OFDM constellation without a timing error and FIG. 2B shows the same signal with a timing error. The points in the constellation plots are the complex value of each subcarrier multiplied by the complex conjugate of the next lower subcarrier, therefore the phase of each point in the plot represents a differential phase between subcarriers. The timing error estimate can be made by measuring the rotation of this constellation from the ideal. By repeating the computation of the rotation required, successive timing errors may be computed, and use to adjust the reference oscillator 62.

Measurement of the timing error in a real multipath environment is made more complex than the ideal case since the received signal is composed of many individual signals with different path delays. FIG. 2C shows the constellation of an OFDM signal that has passed through a multipath channel. The timing ambiguity results in a different "group delay" for each subcarrier and therefore the timing error estimate changes depending on which subcarrier is observed. This problem is overcome by defining a zero timing error as the point where the constellation is rotated so that the individual subcarrier timing errors are distributed equally positive and negative (FIG. 2D). This should ensure that the phase spread caused by the multipath channel has a minimal effect on the phase encoded data.

The procedure for estimating the timing error is shown in FIG. 3. First, the data is estimated from the phase and removed (for example, if the data pair 01 is detected, the signal is rotated by −90° to bring it in line with data pair 00). Then a vector average of all of the subcarriers is computed. Finally, the phase of the vector average is measured and converted into an equivalent timing error. An efficient hardware implementation of this algorithm is discussed below in relation to FIGS. 6A and 6B.

Figure 4:
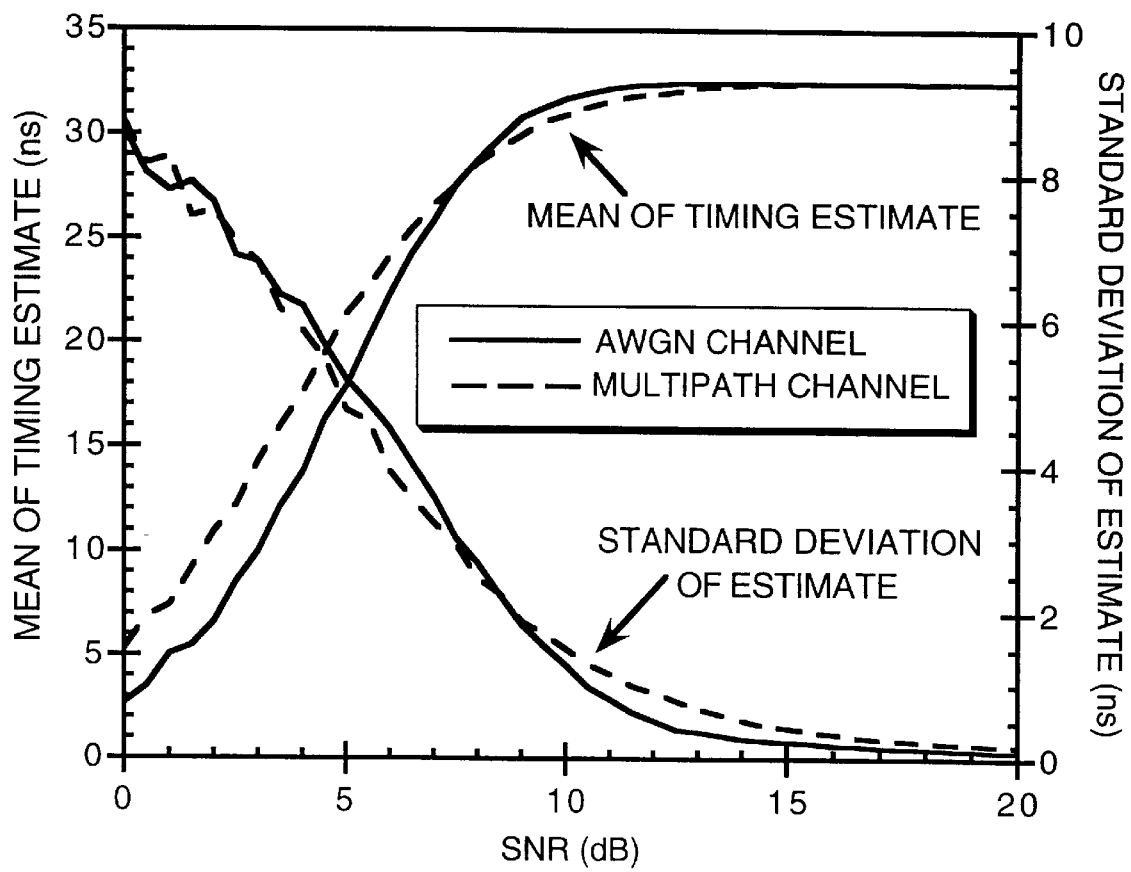
FIG. 4 is a graph showing statistical performance of a timing error estimation algorithm in accordance with one aspect of the invention in an additive white gaussian noise channel and a multipath channel with noise.

The characteristics of this algorithm makes the timing estimate very robust. The error estimate is based on an average of hundreds of subcarriers so it remains accurate even in low signal to noise ratio conditions. The vector average weighs the phase of smaller subcarriers (which are more susceptible to channel noise, group delay from the multipath channel, and data estimation errors) less than larger subcarriers. When the differential phase between subcarriers is computed using complex multiplication, the amplitude of the result is equal to the product of the amplitude of the two subcarriers. If the amplitude of either of the subcarriers is small, the product is small and the result is not weighed strongly in the average. And finally, the timing information is extracted from the full bandwidth of the signal which protects it from multipath fading. FIG. 4 shows the mean and standard deviation of the timing estimate when simulated with an AWGN channel and a measured multipath channel with a 32.5 ns timing error. The estimate remains stable down to an SNR of about 10 dB (reliable data transmission requires at least 20 dB SNR).

Timing error corrections are made by making small changes in the frequency of the terminal's reference oscillator, which in turn controls the rate of the AtoD sample clock. Increasing the sampling clock by $\epsilon$ ppm for t seconds causes the sampling time to advance $\epsilon$t microseconds. If, for example, the receiver was sampling 50 ns late, this could be corrected by increasing the reference clock by 1 ppm for 50 ms.

Figure 5A:
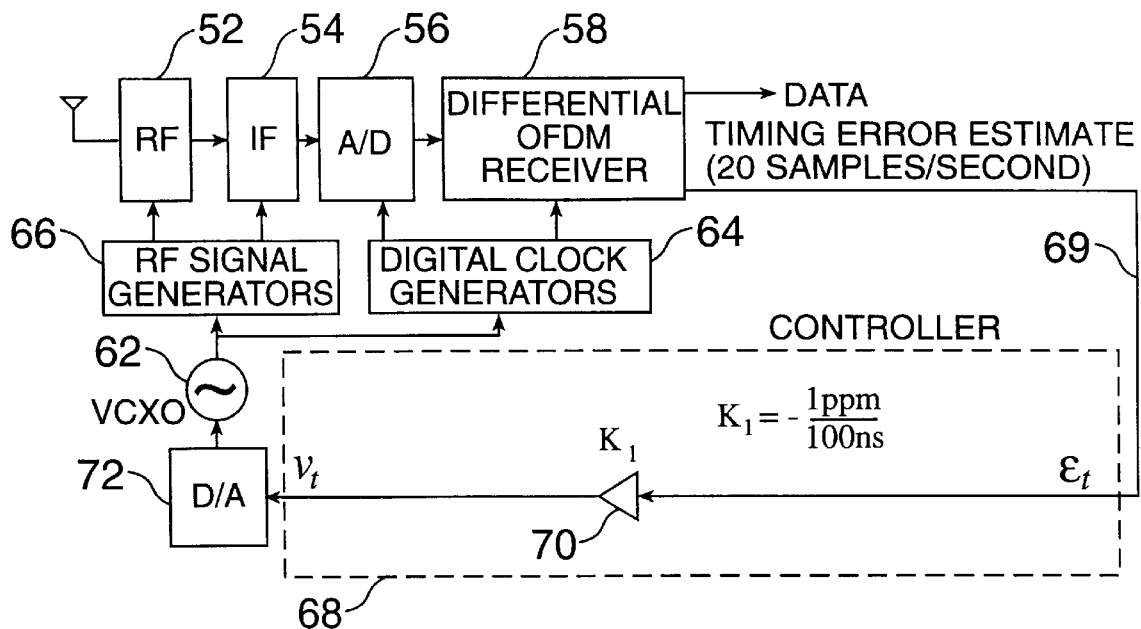
FIG. 5A is a schematic showing an OFDM wireless terminal with a proportional feedback loop for correcting timing errors.

The proportional feedback controller 68 shown in FIG. 5A can be used to adjust the VCXO 62 to force timing errors to zero. The timing error estimate, appearing as a signal on line 69, is amplified by a factor $K_1$ set equal to −1 ppm/100 ns in amplifier 70. In the diagram, $\epsilon_t$ represents the timing error returned from the OFDM receiver in ns, and $V_t$ is the VCXO offset value in ppm. In this case, the voltage supplied to the VCXO 62 is proportional to the timing error. Normally timing measurements are made on the same OFDM blocks that carry data from the base station 10 to the terminal 40.

For terminals that are in an idle state and not receiving a steady stream of data, the base station 10 should provide an alternate block that these terminals can share to maintain synchronization. This block may also transport the system information needed to wake up an idle terminal. If the signal was sampled late (negative $\epsilon_t$) then the feedback loop causes the VCXO 62 to speed up until the sampling catches up with the signal. Similarly, a signal sampled early causes the VCXO 62 to slow down. The constant, $K_1$, is set so that the maximum allowable timing error (100 ns) produces the maximum allowable frequency offset (1 ppm) and therefore timing adjustments do not violate the frequency offset tolerance.

The feedback loop described in the previous paragraph works as long as there is no frequency offset between the base station 10 and the terminal 40. Suppose that the frequency of one of the reference oscillators drifts 0.5 ppm away from the frequency of the other. When the loop is synchronized, the output of the control loop has to be −0.5 ppm to counter toe effect of the frequency offset, therefore a steady state timing error of 50 ns has to be maintained. If the frequencies drift apart by more than 1 ppm then the proportional control loop could not keep both the timing and frequency offset within tolerance. The problem of frequency drifting can be alleviated by adding an integrator branch to the feedback loop as shown in FIG. 5B.

Figure 5B:
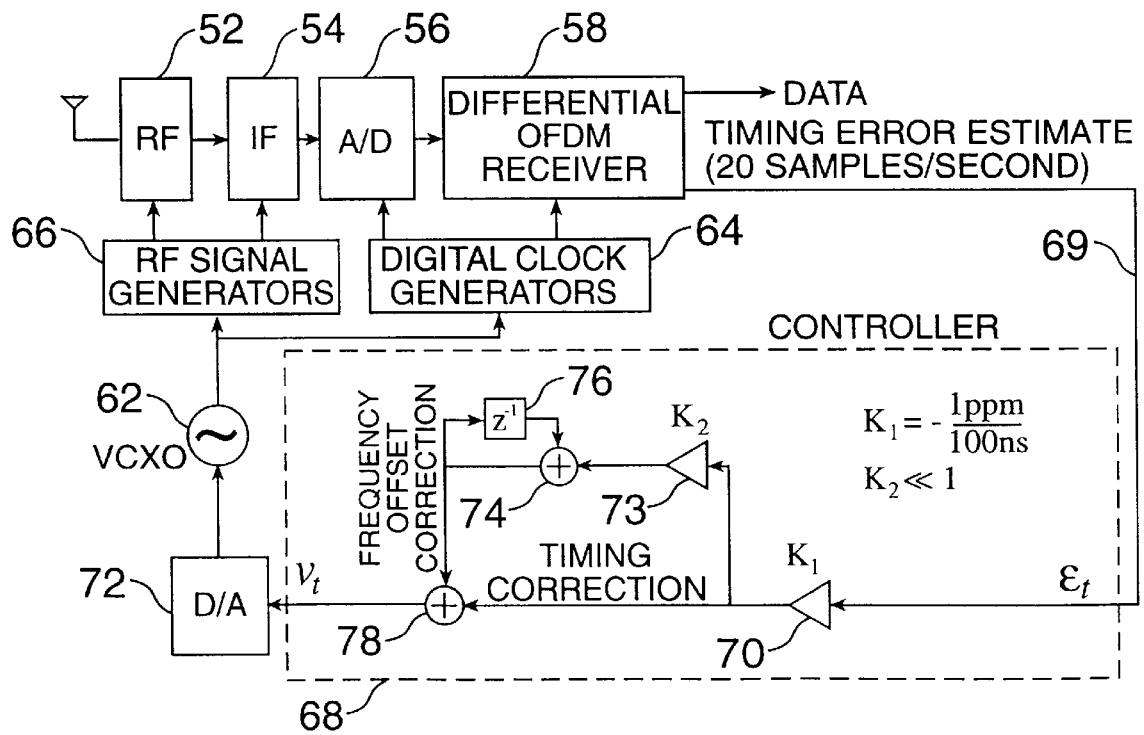
FIG. 5B is a schematic showing an OFDM wireless terminal with a proportional-integral feedback loop for correcting timing and frequency errors.

Referring to FIG. 5B, the controller 71 includes the same amplifier 70 as in FIG. 5A. A feedback loop 73 after the amplifier 70 includes an amplifier $K_2$, whose value is kept much less than 1, for example 0.01, a summer 74, and a delay 76 on a delay loop after the summer 74. The output of the feedback loop 73 is added to the output of the amplifier 70 at summer 78. The effect of the delay is to integrate the output from the amplifier $K_2$ so that the voltage supplied to the VCXO 62 includes a component that is proportional to the timing error and a component that is proportional to a sum of preceding timing errors.

Thus, the integrator loop detects the non-zero condition at the input of the feedback loop and adjusts its output to compensate for the frequency offset. Frequency drifting between the base station 10 and terminal 40 is a slow process usually caused by temperature drifts, supply voltage changes, and component aging so the constant in the integral loop can be set very small.

Even though the data rate of the network is very high, timing adjustments can be made relatively slowly. The proportional feedback loops in FIG. 5 sets the VCXO to a value that corrects the measured timing error in 100 ms. To prevent overshoot, the timing should be readjusted before it reaches the zero point, therefore the VCXO frequency needs to be updated at a rate greater than 10 Hz. Since terminals typically spend most of their time in an idle state, minimizing the number of blocks that the terminal must decode to maintain timing conserves battery energy. A typical rate that satisfies both conditions is 20 timing adjustments per second. If the oscillators are sufficiently stable, it would be possible for the terminals to go into a low-power, standby mode where they would reduce the feedback variable, $K_1$, to slow down the speed of the timing corrections so even fewer timing estimates are required. If $K_1$ is reduced by too much however, the timing conditions may change faster than the feedback loop can respond and timing lock is lost.

When a terminal first connects to the network, it must contend with an arbitrary timing offset and a large potential frequency offset (up to 10 ppm with realistic crystals). Before the feedback loops of FIGS. 5A and 5B can be engaged, both the timing and frequency offsets must be, or be brought, within tolerance. The signal acquisition algorithm synchronizes to a block with a known data pattern called the header block that is transmitted periodically from the base station 10. The header block uses the same OFDM format as all other blocks except that all 400 of its bits are fixed and it does not contain any parity bits. It also serves as a marker for the start of a frame and as a power level reference. The terminal performs a search for this header block and, once found, use it to calculate and remove the timing and frequency offsets.

To aid in the search, the frequency offset tolerance is preferably loosened, for example to 3 ppm. The higher bit error rate that results is tolerable since the search algorithm need only to determine whether a signal is the header block or not. All 400 bits of the header block are known so the algorithm can identify any block that matches at least some pre-selected threshold number, for example 300, of these bits as the header block and provide a signal indicative of positive detection if a match is found. This almost certainly rejects anything but the header block while properly identifying the header with a bit error rate as high as 0.25. The probability of randomly getting at least 300 bits correct out of 400 is about $10^{-24}$.

The search algorithm starts with a guess of the frequency offset and searches for the header with the assumption that the real offset is within 1 ppm of the guess. The reference oscillator 62 is set to a value 2 ppm higher than the guess which puts it between 1 ppm and 3 ppm higher than the actual offset. This intentional offset placed on the reference oscillator 62 causes the timing error to change at a rate between 1 $\mu$s/s and 3 $\mu$s/s. OFDM blocks arrive at a rate of one block every 1.8 $\mu$s so the timing error crosses zero every 0.6 s to 1.8 s (depending on the actual offset). As the OFDM blocks are sliding in and out of proper timing synchronization, the OFDM receiver 58 decodes as many blocks as it can, looking for the header block. At the fastest sliding rate, the signal is within the ±100 ns timing error range for 67 ms, enough time to process 37,000 blocks. If the base station 10 places one header block every 1000 blocks, the search algorithm has plenty of opportunity to find the header block as it slides by and the header blocks do not add any significant overhead to the network. Once the header block is found, then the system can monitor just that block until the timing error reaches zero.

When the header block has been found and the timing error removed, the frequency offset can be measured and removed. This measurement is made by first introducing an intentional timing error by setting the reference oscillator to an initial frequency offset, for example 2 ppm below the guess offset, for a fixed amount of time. During this time, the terminal's receiver is not active. Then, the measurement proceeds by setting the oscillator back to some other frequency offset, for example 2 ppm above the guess, activating the receiver, and measuring the time it takes for the header block to return to proper timing. The frequencies used should straddle the actual (but unknown) frequency of the transmitted OFDM signal, with one above and one below the actual frequency. If the actual frequency offset differs from the guess, then the terminal slides away from the proper timing point at a different rate than it slides back. By measuring the time that it takes for the timing error to return to zero, the actual frequency offset can be calculated from the following equation:

$$\Delta f_0 = \frac{\Delta f_n t_n + \Delta f_p t_p}{t_n + t_p}$$

where $\Delta f_o$ is the correct frequency offset.

$\Delta f_n$ is the frequency offset used to introduce the timing error $\Delta f_p$ is the frequency offset used to correct the timing error $t_n$ is the amount of time spent to introduce the timing error.

$t_p$ is the measured time that it took to correct the timing error.

Since the value sent to the DtoA converter 72 that controls the VCXO 62 is directly proportional to the frequency offset, the DtoA values may be used for $\Delta f_n$ and $\Delta_p$. The equation then returns the value that should be sent to the DtoA converter 72 to get the correct offset. Time measurements can be made in any unit. A convenient unit to use is the period between header blocks. In that case the terminal need only count out a fixed number of header blocks to introduce the timing error, then count the number of header blocks that pass before the timing returns to normal.

The system can then set the reference oscillator 62 to the calculated offset frequency and engage the feedback loop 71 to maintain correct timing.

The timing error found using the header block need not be set to zero to find the frequency offset, but some other pre-determined value may be used. However, a zero timing error makes the computations somewhat easier.

If the offset guess is not within 1 ppm of the actual offset then one of two things happens: either the header is not found within 1.8 s in the initial search, or the signal does not return to zero timing error within a time of $3t_n$ during the frequency offset calculation. If either of these conditions occur then a new offset guess has to be made and the whole procedure repeated until the full range of the reference oscillator 62 has been explored. A good initial guess would be the frequency offset when the terminal 40 last disconnected from a network. If there have not been any drastic changes in the environment, this value should be very close to the actual offset. Subsequent guesses preferably radiate out from that (for example, 2 ppm above, 2 ppm below, 4 ppm above, etc.) thus using subsequent frequency offsets that are different from the first guess at the frequency offset.

The base station 10 of the network establishes evenly spaced timing slots where it can transmit and receive information. As described above, the terminal 40 times its receiver clocks 64 so that they receive the base station's signals at the proper time and in this manner the wireless terminal is synchronized to the base station. The wireless terminal 40 should also time its transmitted signals so that they arrive at the base station 10 at the proper time.

One method that the terminal 40 could use would be to tie its transmitter clock directly to its receiver clock so it transmits at the same position within the slot as it receives. This method will work until the two devices move far enough apart that the propagation delay between them becomes significant. The signal that the base station 10 receives from the terminal 40 arrives two propagation times late due to the round trip delay. In order for the terminal's signal to arrive at the proper time at the base station 10, the terminal 40 must transmit earlier in the timing frame than it receives.

When the terminal 40 first connects to the base station 10 it assumes that the propagation delay is zero and transmits a block to the base station 10. The network frame will be divided into two sections, the first is where the base station 10 transmits to the terminal 40 and the second is where the terminal 40 replies. In-between sections will be one or two unused slots where the transients from power amplifiers powering up and down are allowed to settle. When the terminal 40 first transmits back to the base station 10, it should be assigned the last time slot in the frame. When the signal arrives late, it will only interfere with an unused slot. In this manner, the signal sent from the wireless terminal to the base station is synchronized to the synchronization of the receiver at the wireless terminal. The base station 10 measures the timing error created by the communication channel according to the method of the invention and transmits, through for example a digital control channel, the result back to the terminal 40 where the transmit timing can be adjusted. Note that at this point, the timing error could be as much as 200 ns (for a 30 m separation) which would prevent the base station 10 from decoding the block. If this happens repeatedly, then the base station 10 can ask the terminal 40 to transmit 100 ns earlier and then try again. Once the proper transmitter timing is achieved it should be checked and updated periodically. In indoor applications, the distance between devices does not change rapidly so the update frequency should be on the order of once per second.

Figure 6A:
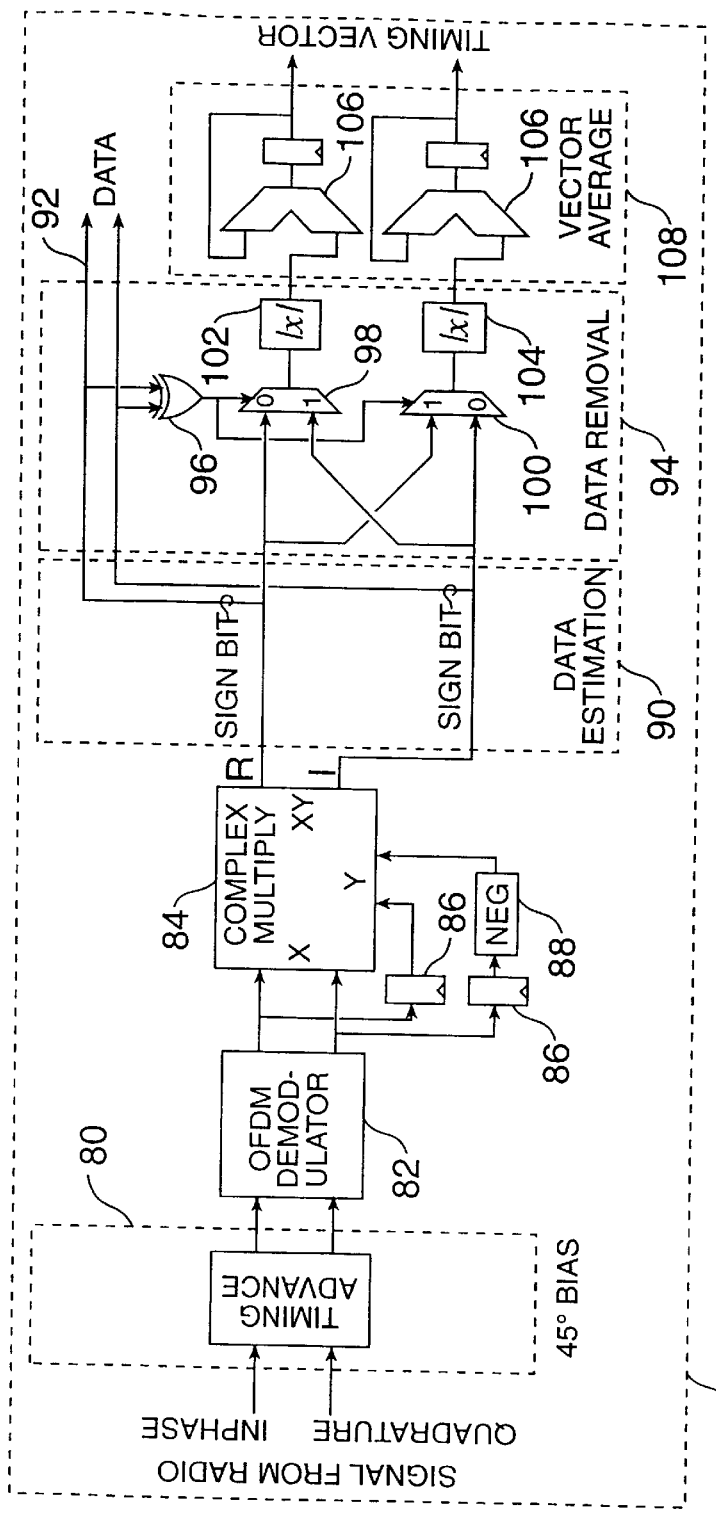
FIG. 6A is a schematic showing an implementation of an OFDM receiver in accordance with an embodiment of the invention.
Figure 6B:
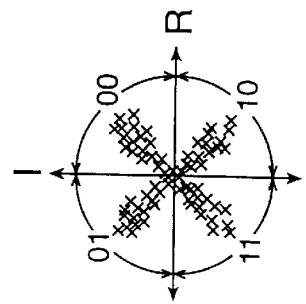
FIG. 6B is a diagram showing effect of a 45° timing advance on an OFDM constellation.

FIG. 6A shows a preferred implementation of the timing error estimation hardware. To simplify the process of data estimation and removal, the timing of the signal is advanced with timing adjustor 80 before the OFDM demodulator 82 to produce a 45° bias in the output constellation. In FFT based OFDM demodulators, the timing advancement can be achieved by moving the beginning eighth of the data set to the end of the data set before performing the FFT. Since the FFT algorithm requires that the data be re-ordered before processing, this operation can be merged into the FFT operation in a way that does not add any complexity to the circuit. With the 45° bias in the constellation, creating an estimate of the data bit pair from the subcarrier products becomes a trivial matter as is shown in FIG. 6B. Any time that the signal falls below the real axis, then the high order bit is one; or equivalently, the high order bit is the sign bit of the imaginary component of the signal. Similarly, the low order bit is the sign bit of the real component.

The OFDM demodulator 82 repeatedly clocks out the detected subcarrier measurements in order, for example from the lowest frequency to the highest.

The subcarrier measurements (real and imaginary values) are output from the OFDM demodulator 82 to a computing means 84 that carries out a complex multiplication of complex values X and complex values Y. Such computing means are well known in the art. The values X are received directly from the OFDM demodulator 82. Values Y are first delayed at delay means 86, and the imaginary components of values Y are inverted by inverter 88. By selection of the appropriate delay, that is, the time taken for one measurement, the value at Y will be one subcarrier lower than the subcarrier received at X. The computing means 84 outputs the value XY, from which the phase differential of the subcarriers may readily be determined by known methods. The phase differential corresponds to the angle of the vector formed by the real and imaginary components of the value XY in the complex plane.

In the next block, estimator 90, the data is estimated by the sign of the real and imaginary components, and output at 92. Data is then removed from the signal by computing means 94.

Removing the data from the signal will move all four states of the constellation to the 00 state at 45°. If R is the real component of the signal, I is the imaginary component, and T is the signal with the data removed, then the algorithm to remove the data can be expressed as:

If the data bits are 00, then T=R+jI;
else if the data bits are 01, then T=(R+jI)*(−j) =I −jR;
else if the data bits are 11, then T=(R+jI)* (−1) =−R −jI;
else if the data bits are 10, then T=(R+jI)* j=−I +jR.

With some manipulation the algorithm can be reduced to:

If the data bits are 00 or 11, then T=|R|+j|I|;
else if the data bits are 01 or 10, then T=|I|+j|R|.

It is this method that is implemented in FIG. 6A to remove the data. The data is input to exclusive or gate 96 which controls multiplexers 98 and 100. The multiplexers 98 and 100 work as follows. If the output from the exclusive OR gate is low, or zero, then the multiplexers will output the value at the zero input. If the output from the exclusive OR gate is high, or 1, then the multiplexers will output the value at the one input. The absolute value of the output of the multiplexers 98, 100 is then taken at 102 and 104.

Once the data is removed, a pair of accumulators 106 in means 108 are used to calculate the vector average of all subcarrier products. Technically this is calculating a summation not an average, but both operations produce a result with the same phase component so the change will not affect the timing estimate. The amplitude of this summation provides a good approximation of the total power of the received signal and can be used for automatic gain control.

The vector average is converted into an equivalent timing error by the OFDM receiver 58. The OFDM receiver 58 can calculate the timing in one step by searching through a table with pre-computed tangents for a number of timing values within the timing range. For example, if the ±100 ns timing error range is divided into 64 table entries, the controller could search for the timing error within 3 ns with only a six level binary search. Such an operation performed 20 times a second would place only a minor load on a simple micro-controller chip.

A person skilled in the art could make immaterial modifications to the invention described in this patent document without departing from the essence of the invention that is intended to be covered that the claims that follow.

The embodiments of the invention in which an exclusive property or privilege is claimed are defined as follows:

1. A method of processing an OFDM signal comprised of plural sub-carriers, in which information is carried in phase differentials between sub-carriers, the phase differentials having a pre-determined distribution in the complex domain, the OFDM signal being received by a receiver having a reference oscillator, the method comprising the steps of:
    repeatedly detecting real and imaginary values of plural sub-carriers wherein the real and imaginary values form a constellation of real and imaginary values of the plural sub-carriers;
    computing successive timing errors by repeatedly estimating the rotation required to rotate the constellations to coincide with the pre-determined distribution; and
    adjusting the reference oscillator according to the timing errors.

2. The method of claim 1 in which the step of detecting the real and imaginary values comprises the step of:
    demodulating the sub-carriers; and
    complex multiplying values of a first sub-carrier by the complex conjugate of values of a second sub-carrier to produce complex products.

3. The method of claim 2 further comprising the step of removing the data from the complex products to produce data corrected complex products.

4. The method of claim 3 in which computing the timing errors comprises the step of:
    computing the vector average of the data corrected complex products, whereby the angle of the vector average represents an estimate of the timing error.

5. The method of claim 3 further comprising the step of advancing the timing of the sub-carriers before demodulating the sub-carriers.

6. The method of claim 1 further comprising the steps of:
    periodically transmitting a frame header block whose expected data set is known;
    demodulating the frame header block to detect the real and imaginary values of plural subcarriers and thereby estimate the data set;
    comparing the estimated data set to the expected data set; and
    producing a signal indicative of positive detection if a threshold number of data points in the estimated and expected data sets match.

7. The method of claim 1 in which the receiver comprises an RF signal generator and a digital clock generator and the method further comprises the step of:
    providing a reference frequency from the reference oscillator to both the RF signal generator and the digital clock generator simultaneously.

8. The method of claim 1 in which the step of adjusting the reference oscillator comprises the step of:
    supplying a voltage controlled oscillator with a voltage that is proportional to the timing error.

9. The method of claim 1 in which numerous timing error measurements are made and the step of adjusting the reference oscillator comprises the step of:
    supplying a voltage controlled oscillator with a voltage that includes (a) a component proportional to the timing error and (b) a component proportional to a sum of preceding timing errors.

10. A wireless terminal, comprising:
    RF means for detecting RF signals wherein information is carried as phase differentials between subcarriers;
    a sampler connected to the RF means for receiving downconverted signals from the RF: means and producing digitized RF signal blocks of the downconverted signals;
    a differential OFDM receiver comprising means for computing a timing error estimate for the digitized RF signal blocks based on rotation of a constellation of real and imaginary values of the digitized RF signal blocks, the OFDM receiver having as output a timing error estimate;
    a voltage controlled reference oscillator having as input a voltage related to the timing error estimate and as output a signal having a reference frequency;
    an RF signal generator connected to receive the reference frequency signal from the voltage controlled reference oscillator and to provide an RF signal to the RF means; and
    a digital clock generator connected to receive the reference frequency signal from the voltage controlled reference oscillator and to provide a digital clock to the sampler.

11. The wireless terminal of claim 10 in which the OFDM receiver comprises:
    a demodulator for demodulating the sub-carriers; and
    means for complex multiplying real and imaginary values of successive sub-carriers to produce complex products.

12. The wireless terminal of claim 11 further comprising means for removing the data from the complex products to produce data corrected complex products.

13. The wireless terminal of claim 12 in which the differential OFDM receiver comprises:
   means for computing the vector average of the data corrected complex products, whereby the angle of the vector average represents an estimate of the timing error.

14. The wireless terminal of claim 13 further comprising means for advancing the timing of the sub-carriers before demodulating the subcarriers.

15. The wireless terminal of claim 11 further comprising a controller connected to receive timing error estimates from the OFDM receiver and provide as input to the voltage controlled reference oscillator a voltage that is proportional to the timing error.

16. The wireless terminal of claim 11 further comprising a controller connected to receive timing error estimates from the OFDM receiver and provide as input to the voltage controlled reference oscillator a voltage that includes (a) a component proportional to the timing error and (b) a component proportional to a sum of preceding timing errors.

* * * * *